United States Patent
Janssens et al.

(10) Patent No.: US 7,615,174 B2
(45) Date of Patent: Nov. 10, 2009

(54) MASTERBATCH CONTAINING ADHESIVE PMMA AND ITS USE FOR THE PRODUCTION OF POLYOLEFIN FILMS

(75) Inventors: Marcel Janssens, Dendermonde (BE); Tony Daponte, Zwijndrecht (BE)

(73) Assignee: A. Schulman Plastics, Bornem (BE)

( * ) Notice: Subject to any disclaimer, the term of this patent is extended or adjusted under 35 U.S.C. 154(b) by 0 days.

(21) Appl. No.: 11/856,485

(22) Filed: Sep. 17, 2007

(65) Prior Publication Data

US 2008/0103259 A1 May 1, 2008

Related U.S. Application Data

(62) Division of application No. 10/914,541, filed on Aug. 9, 2004, now Pat. No. 7,271,220.

(30) Foreign Application Priority Data

Aug. 8, 2003 (EP) .................................. 03018091

(51) Int. Cl.
   *B28B 3/20* (2006.01)
   *B29C 47/00* (2006.01)
   *B27N 7/00* (2006.01)
(52) U.S. Cl. .................................. 264/176.1; 264/340
(58) Field of Classification Search ............... 264/176.1, 264/340
   See application file for complete search history.

(56) References Cited

U.S. PATENT DOCUMENTS

| 5,124,407 | A | | 6/1992 | Fontana et al. |
| 5,286,790 | A | * | 2/1994 | Laughner ..................... 525/67 |
| 5,969,007 | A | * | 10/1999 | Janssens ..................... 523/205 |
| 6,476,111 | B1 | | 11/2002 | Beauchemin et al. |
| 6,670,035 | B2 | | 12/2003 | Pittman et al. |
| 6,916,527 | B2 | * | 7/2005 | Ikegawa et al. .......... 428/301.1 |
| 2003/0138581 | A1 | * | 7/2003 | Smith et al. ................ 428/36.9 |

OTHER PUBLICATIONS

"Atofina Launches New Epoxy-Containing Terpolymer Additive," May 14, 2003, http://www.specialchem4polynners.com/resources/latest/displaynews.aspx?id=1256&or=s215420_102_*q=lotader+.

* cited by examiner

*Primary Examiner*—Nathan M Nutter
(74) *Attorney, Agent, or Firm*—Sutherland Asbill & Brennan LLP

(57) ABSTRACT

The present invention relates to a masterbatch composition which contains a polyolefin base resin, polymethylmethacrylate (PMMA) pearls and a further polymeric compound obtained at least from olefinic monomers, olefinic monomers containing an ester functionality and olefinic monomers containing an ether functionality, as well as to the masterbatches obtained from this composition. The present invention is further directed to monolayer as well as multilayer films which are made using the inventive masterbatches, their methods of production and the use of said films for packaging purposes.

25 Claims, 2 Drawing Sheets

MASTERBATCH CONTAINING ADHESIVE PMMA AND ITS USE FOR THE PRODUCTION OF POLYOLEFIN FILMS

CROSS-REFERENCES TO RELATED APPLICATIONS

This application is a divisional application of U.S. application Ser. No. 10/914,541 filed on Aug. 9, 2004, (U.S. Pat. No. 7,271,220), which claims priority to European Patent Application No. EP 03 018 091.3 filed on Aug. 8, 2003.

BACKGROUND OF THE INVENTION

The present invention is directed to a masterbatch composition containing polymethylmethacrylate (PMMA) pearls with improved adhesion and the corresponding masterbatch obtained thereof which, when used for the production of mono- or multilayer polyolefin films, leads to polyolefin films with improved integrity and stability properties.

In the development of packaging materials, especially for transparent packaging, mono- or multilayer polyolefin films have gained more and more importance because they are high in gloss, scratch-proof and durably transparent. Depending on the use these mono- or multilayer polyolefin films may be further metallized on their exterior layer, like for example metallized bi-oriented polypropylene (BOPP) films which are used in the packaging of for instance potatochips because of their barrier properties. Therefore, multilayer polyolefin films represent an interesting alternative for cellophane as packaging material.

However, these mono- or multilayer polyolefin films may cause problems when being used in high-speed packaging and/or processing machines because of their high film-to-film and film-to-metal coefficient of friction. This high coefficient of friction causes the films to adhere to each other and to develop a tendency of becoming sticky when surface pressure is applied.

To prevent these disadvantageous effects, it is known from the state of the art to use films in which antiblocking agents are incorporated. In this respect, different tendencies can be observed. On the one hand, an organic antiblocking agents like silica, talc, calcium carbonate, and silicates were used. However, the use of such antiblocking agents leads to a deterioration in optical properties of the obtained films and, additionally, because of an insufficient binding of said antiblocking agents to the polyalkylene matrix, to an extraction of those particles when slitting the film, causing their distribution over the film and the processing machine.

To overcome these problems, U.S. Pat. No. 5,969,007 describes the use of low density or high density polypropylene or polyethylene grafted with maleic anhydride or an ethylene-acrylic acid-copolymer as a surface-modifying reagent which is supposed to function as an adhesive promoter between the polyalkylene matrix and the silicate antiblocking particles when producing masterbatches thereof.

To further improve the optical properties of the polyolefin films on the other hand, there has been a tendency to use organic or at least organic moieties containing slip agents, like polydialkylsiloxane or fatty amides. However, those slip agents exhibit migratory properties which as well deteriorates the optical properties. Thus, WO 03/004269 presents the use of polymethylmethacrylate (PMMA) pearls in the exterior layer, which do not migrate.

Since such films still show disadvantages with regard to friction, transparency, and gloss, U.S. Pat. No. 5,077,129 discloses the use of a copolymer or mixtures of polymerized isobutyl methacrylate and methyl ethyl methacrylate.

However, because of a lack of binding within the polymeric matrix material, even the combination of these two methacrylate compounds leads to the above already mentioned problem known in the industry as "scuffing" which is the extraction of the particles out of the polymer surface under high shear developed for instance during mono-orientation of said films or during packaging processes on high speed packaging lines.

DESCRIPTION OF THE INVENTION

Figure 1:
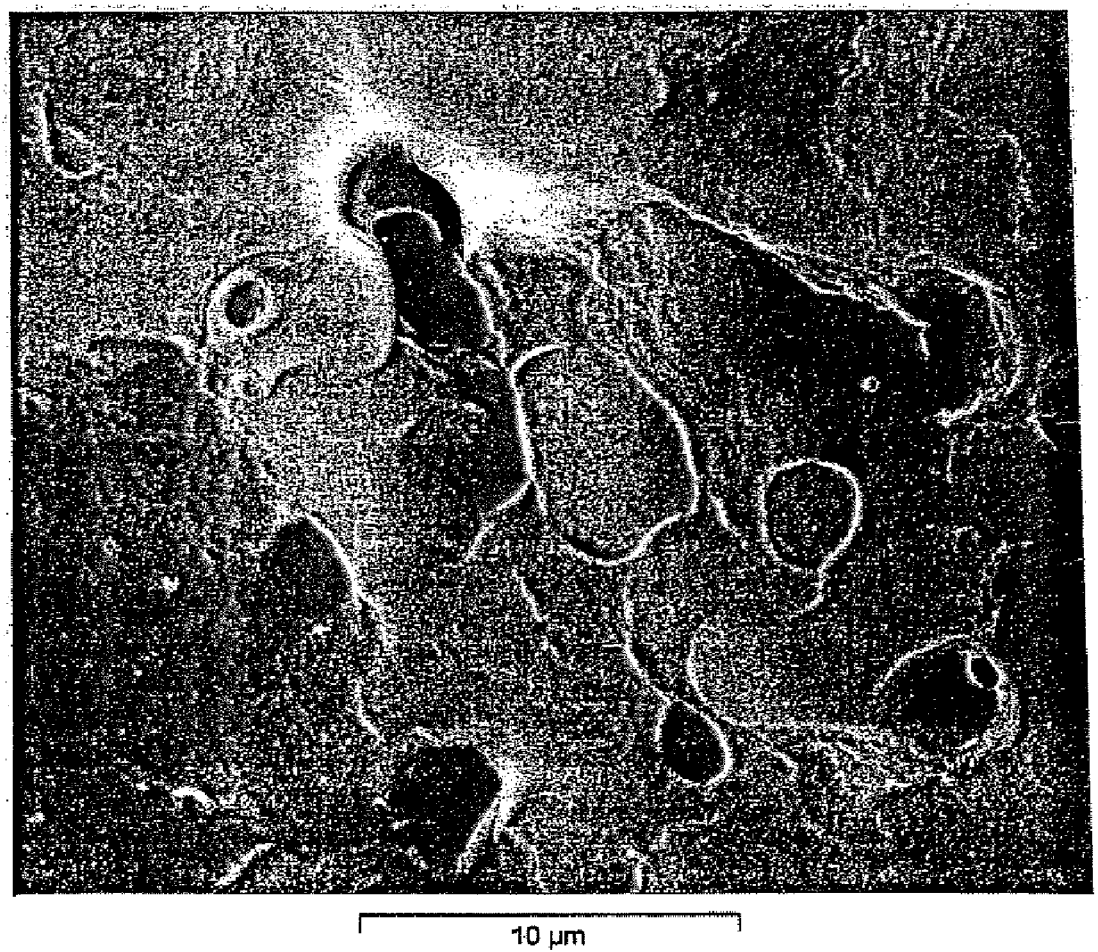
FIG. 1 is a photograph taken with a scanning electron microscope (SEM), showing that during the breaking process of the cooled comparative masterbatch pellets, many particles are extracted from the pellets.

The present invention therefore seeks to provide a masterbatch composition containing polyolefins and PMMA pearls which when formed into masterbatches results in PMMA pearls adhered to the polyolefin matrix. One further object is to provide mono- or multilayer polyolefin films made using said masterbatches, in which the above "scuffing" effect is diminished.

The first problem is solved by a masterbatch composition which contains a polyolefin base resin, PMMA pearls and a further polymeric compound which is obtained at least from olefinic monomers, olefinic monomers containing an ester functionality and olefinic monomers containing an ether functionality and using said masterbatch composition for the production of masterbatches.

Within the scope of the invention, masterbatch is understood to be a base mixture, particularly a granulate, dust-free composition at least of the components described above, namely a polyolefin base resin, PMMA pearls and a further polymeric compound called hereinafter "GMA". Preferably the GMA terpolymer is a terpolymer of ethylene, methylacrylate, and glycidylmethacrylate. It is obtained from ATOFINA, France and sold under the name of LOTADER AX 8900. This terpolymer has a methacrylate content of 24 wt-% and a glycidylmethacrylate content of 8 wt-%. Such a masterbatch is used in the production of plain mono-layer or multi-layer polyolefin films together with a polyolefin base resin and is extruded with the same into films.

In this composition, the further polymeric compound is supposed to function as an adhesive promoter between the polyolefin base resin and the PMMA pearls. Without being bound to this theory, it is assumed that the further polymeric compound reacts in some way with the surface of the PMMA pearls which improves the adherence between the PMMA pearls and the polyolefin base resin.

The polymeric base resin according to the present invention may be either a homopolymer, a copolymer, or a terpolymer. Especially polyolefin base resins obtained from ethylene and/or propylene monomers have been found as very useful. As for the polyolefin base resin, it may be chosen from polypropylene (PP), low density polyethylene (LDPE), linear low density polyethylene (LLDPE), metallocene linear low density polyethylene (mLLDPE), or high density polyethylene (HDPE). In further embodiments, the polyolefin base resin represents a random ethylene, propylene copolymer polypropylene, a random ethylene, butylene, propylene terpolymer polypropylene or mixtures of one or more of said homo-, co- or terpolymers.

The PMMA used as anti-blocking agent in the present application is preferably crosslinked. The PMMA anti-blocking agent may be contained in the masterbatch composition in an amount of from 1 to 40 weight %, preferably 1 to 10 weight %, most preferred 5 weight % of the total masterbatch composition.

In an especially advantageous embodiment the PMMA is present in form of pearls which have an average particle size of 1 to 20 μm, preferably 4 to 10 μm. The PMMA particles which are useful in the present application can be exemplified by the ones sold under the name of Epostar MA 1004, obtainable from Nippon Shokubai.

The olefinic monomer used in the present application as main component in the further polymeric compound preferably is "GMA". It may be present in the terpolymer composition in an amount of from 45 to 98 wt-%.

The olefinic monomer containing an ester functionality may be represented by an acrylic ester of the general formula

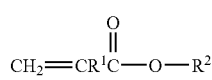
(1)

and wherein $R^1$ may be H or $CH_3$ and $R^2$ can be selected from methyl, ethyl, n-butyl, I-butyl, t-butyl group. Preferably, $R^1$ is H and $R^2$ is methyl group. The amount of the compound according to general formula (I) can vary from 1 to 35 wt-%, preferably 20 to 30 wt-% and most preferred 24 wt-%.

In the ether functionality containing olefin monomer according to the present application, the ether functionality may be represented by an epoxide functionality. In a preferred embodiment, said ether functionality containing olefinic monomer additionally contains an ester functionality which preferably terminates the olefinic ether containing monomer, which means it has the greatest distance to the olefinic moiety.

Preferred olefinic monomers containing an ether as well as an ester functionality can be exemplified by a glycidyl acrylate compound of the general formula

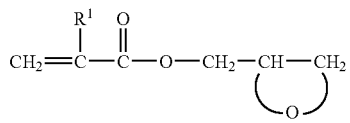
(II)

in which $R^1$ may be H or a $C_1$ to $C_{36}$ alkyl group. Preferably, $R^1$ is $CH_3$. The amount of the compound according to formula (II) is in the range of from 1 to 20 wt-%, preferably 2 to 10 wt-%, and most preferred 8 wt-%.

In an especially advantageous embodiment, the further polymeric compound contained in the present inventive masterbatch composition is a terpolymer of an olefin, an olefinic ester, and an olefinic ether, wherein the olefinic ether may optionally contain an additional ester functionality.

One example of said terpolymer which may be used in the present application is represented by a terpolymer of ethylene, an acrylic ester, and a glycidal acrylate compound as defined above. The most preferred terpolymer employed herein has the general formula

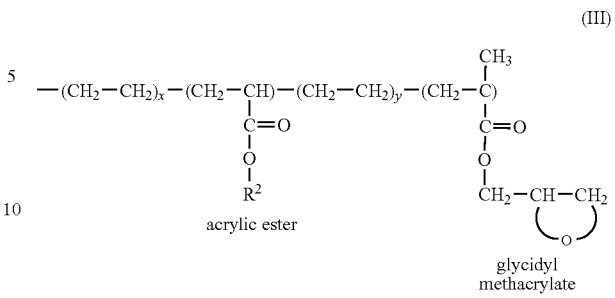
(III)

with $R^2$ being selected from a methyl, ethyl, n-butyl, i-butyl, and t-butyl group, x, y being an integer selected from 1 to 100, preferably being 10 to 30 and which in the following is referred to as GMA terpolymer. The preferred GMA terpolymer has the following composition properties:

| | GMA terpolymer |
|---|---|
| Methyl acrylate | 20-30 wt-%, pref. 24 wt-% |
| Glycidyl methacrylate | 6-10 wt-%, pref. 8 wt-% |
| Melt Index (2.16 Kg, ASTM D1238) | 4-7.5 G/10 min, pref. 6 G/10 min |
| Melting Point (DSC) | 45-75° C., pref. 60° C. |
| Vicat Softening Point (ASTM D638) | <40° C. |
| Tensile Strength at break (ASTM D638) | 650-970 psi, pref. 810 psi |
| Elongation at Break (ASTM D638) | 720-1080%, pref. 900% |
| Hardness A (ASTM D2240) | 55-85, pref. 70 | pref. = preferably

The further polymeric compound, like for example the above GMA terpolymer, may be contained in the masterbatch composition in an amount of from 5 to 30 weight %, preferably from 8 to 12 weight % and most preferred of 10 weight % of total masterbatch composition.

The above specified masterbatch composition is used for the production of masterbatches which themselves may be further processed as is known in the art, for example, for the production of films or other plastic products.

The production of the masterbatch using the above described masterbatch composition according to the invention is performed using devices usually employed for compounding. For instance, there may be mentioned: single screw or double-screw extruders, Banburry type mixes, Farrell continuous mixers, Buss Ko kneaders etc.

In the production of the masterbatch, the polyolefin base resin together with the PMMA pearls is introduced, i.e., into the above compounding device, melted and compounded. The further "GMA" polymeric compound is added during the compounding process. Subsequently the composition is cooled and granulated. During compounding, the further polymeric compound is supposed to react with the surface of the PMMA pearls, thus enhancing binding between the PMMA (particles) and the polymeric matrix. This reaction results in an excellent dispersion and adherence of the PMMA particles to the polymeric base resin.

The present invention is further directed to a monolayer film which is made using at least the masterbatch obtained from the above mentioned masterbatch composition and at least one polyolefin polymer into which the masterbatch composition has been mixed. Further components like other polymeric base materials which are known in the art may as well be added depending on the desired properties of the monolayer film. The masterbatch composition may be contained in the monolayer forming composition in an amount of from 1 to 20 weight %, preferably of from 3 to 8 weight % and more preferred of 5 weight %.

It is preferred that the polyolefin polymer in which the masterbatch is diluted is selected from polyethylene, which may be LDPE, LLDPE, mLLDPE, or HDPE, or polypropylene like homopolymer, a random copolymer polypropylene which preferably is a random ethylene, propylene copolymer polypropylene, or a random terpolymer polypropylene which preferably is a random ethylene, butylene, propylene copolymer polypropylene, or mixtures thereof.

The monolayer films according to the present application optionally may be mono- or bi-axially stretched which leads to mono- or bi-axially oriented films. Depending on the desired properties of the film, it is also possible not to stretch the monolayers at all, which results in non-axially oriented films. Orienting of the films may be achieved by the common methods known in the art.

To obtain additional specific properties further additives which are commonly used according to the state of the art may be added to the film forming composition containing the masterbatch according to the present invention and the polyolefin polymer. These additives include, but are not limited to, further antiblocking agents, lubricants, antistatic agents, stabilizers, colorants, antioxidants, antifogs, fillers etc.

The above monolayer films may be produced by diluting the above masterbatches in said polyolefins on blown, cast, or bi-oriented film extrusion lines as well-known in the industry, forming a film from the dilution and optionally mono- or bi-axially orienting the obtained monolayer film.

The present invention is further directed to a multilayer film in which at least one of the layers, preferably the exterior skin layer, represents a layer corresponding to the above described monolayer film which is formed using the inventive masterbatch. In a preferred embodiment the multilayer film represents a co-extruded bi-orientated PP film which consists of a core layer and one or more exterior layers, wherein the inventive masterbatches are contained in the exterior layer. It is preferred that the skin layer of said multilayer film is heatsealable. The skin layer may as well be metallized as is known in the art. In said multilayer films, it has been found to be advantageous to use as the polyolefin base resin the copolymer polypropylene or the terpolymer polypropylene which are further described above, namely random ethylene propylene copolymer polypropylene and random ethylene butylene propylene terpolymer polypropylene, as well as a mixture thereof. However, any other polymeric base material known in the art may as well be used.

The multilayer films according to the invention are produced using common methods known in the art. The method is exemplified but not restricted to a procedure in which the inventive masterbatch is mixed with the polyolefin base resin; the obtained mixture is co-extruded with at least one further film base material which may be identical to or different from the ones used as polyolefin base resin; and a multilayer polyolefin film is formed from the co-extrusion.

Optionally, one or more of the layers may be mono- or bi-oriented. In case one or more of the layers are oriented, the orienting may proceed either separately for each of the layers which are supposed to be oriented, or the multi-layer itself may be oriented. As an additional option, the exterior layer may be metallized by vacuum deposition using, for example, aluminum.

The mono-layer as well as the multi-layer films produced from the masterbatch composition or the masterbatches according to the present invention, respectively, are useful for any kind of packaging made by blown or cast film, BOPP (biaxially oriented PP) or any other film producing process.

The may as well be suitable for film lamination.

In the following, the subject matter of the present invention is exemplified. It is not intended to restrict the scope of the invention to these examples.

EXAMPLES

Production of the Masterbatch

A concentrate is produced on a compounding device as mentioned in the state of the art like a banburry-mixer, a twinscrew compounding line like the ZSK's and/or Buss-Ko-Kneader supplied by Coperion (Stuttgart, Germany), wherein the latter is preferred. The following compounds are used.

A random copolymer polypropylene as described above which is a 4 wt-% ethylene containing polypropylene copolymer from BP/AMOCO/SOLVAY sold under the name ELTEX KS 407.

PMMA pearls sold under the name of Epostar MA 1004, produced by Nippon Shokubai, which are crosslinked and have a particle size of 4 μm.

The GMA terpolymer adhesive promoter is obtained from ATOFINA, France and sold under the name of LOTADER AX 8900. This terpolymer has a methacrylate content of 24 wt-% and a glycidylmethacrylate content of 8 wt-%.

The composition of the inventive masterbatch composition CMB in comparison with a comparative masterbatch composition MB is presented in table 1 below. If not otherwise indicated, percentages refer to weight %.

Figure 2:
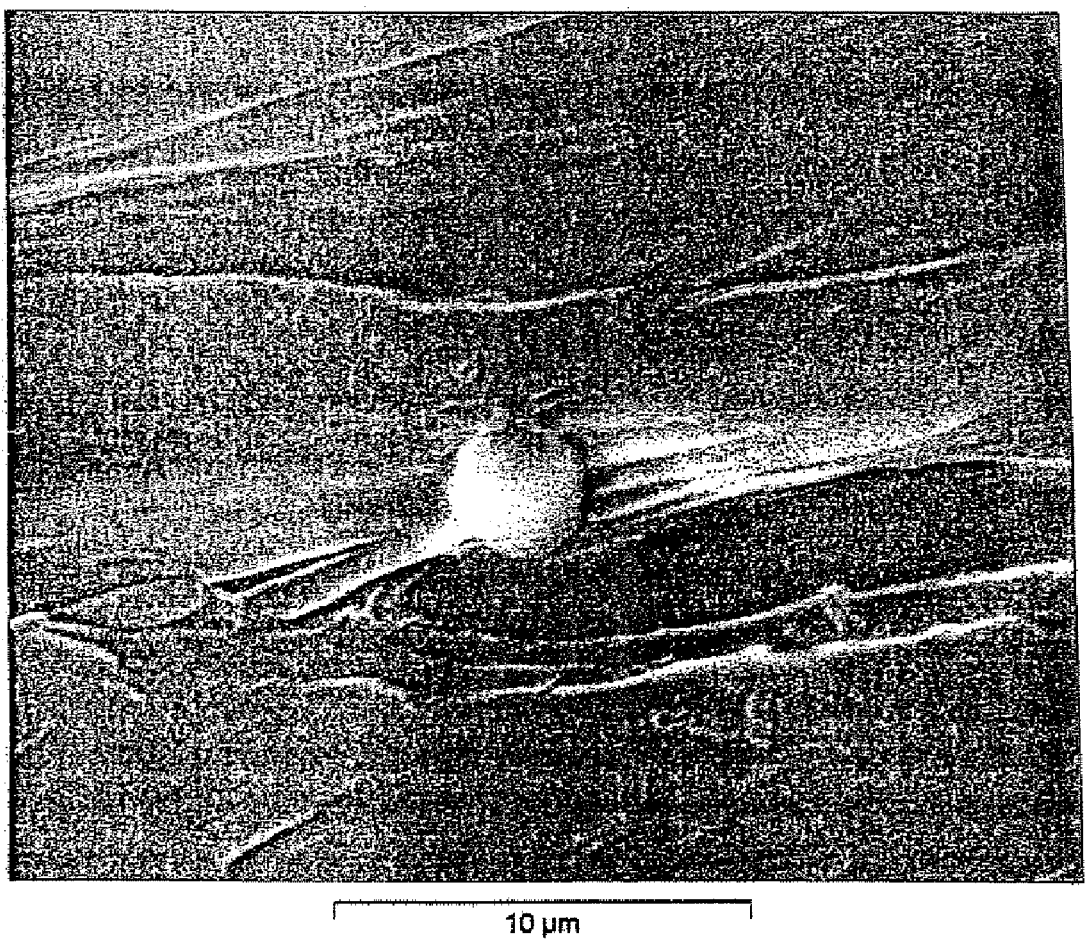
FIG. 2 is a photograph taken with an SEM, showing that by adding 10 wt-% of the GMA terpolymer to the masterbatch composition containing the polyolefin base resin and PMMA pearls, the surface of the broken pellets is clean and no holes are observed.

To demonstrate the advantageous adhesion of the PMMA particles to the polyolefin base resin matrix when compounding takes place in the presence of the GMA terpolymer, the pellets of the obtained masterbatch were cooled down to −50° C. with liquid nitrogen, broken and subsequently the fracture surface was pictured with a Scanning Electron Microscope (SEM) which pictures are shown in FIGS. 1 and 2.

TABLE 1

|  | MB | CMB |
| --- | --- | --- |
| random copolymer polypropylene | 95% | 85% |
| PMMA | 5% | 5% |
| GMA terpolymer adhesion promoter | 0% | 10% |
| SEM photograph of the fracture surface | FIG. 1 | FIG. 2 |

FIG. 1 shows, that during the breaking process of the cooled comparative masterbatch pellets many particles are extracted from the pellets. At the positions on the fraction surface in which they were placed before remained holes. This demonstrates that there will be no adhesion between the PMMA particles and the non-polar polyolefin if no GMA terpolymer adhesion promoter is added.

FIG. 2 shows, that by adding 10 wt-% of the GMA terpolymer, which is compatible with polyolefines, to the masterbatch composition containing the polyolefin base resin and PMMA pearls, the surface of the broken pellets obtained from said masterbatch composition is clean and no such holes are observed. This demonstrates that the addition of the GMA terpolymer to the masterbatch composition results in a firm binding between the PMMA surface and the polymermatrix.

Moreover, a three-layer film is produced using the inventive masterbatch CMB as well as the comparative masterbatch MB, both as obtained above, each in an amount of 56 weight % in the skin layer of the film composition with homo PP in the core layer. In each case, the masterbatch is diluted in random copolymer polypropylene as defined above, wherein the random copolymer polypropylene represents 95 weight % of the total weight of the skin layer of the film composition.

The resulting films exhibited a thickness of 20 μm. Both films were tested on a high-speed line like for packaging of cigarette packs (400 packs per minute) to compare the "scuffing" effect defined above.

While on the packaging line using the film obtained from the inventive masterbatch CMB no powder caused by extraction of PMMA particles from the films could be observed. On the packaging line using the film obtained from the comparative masterbatch MB, several parts of the machine were covered with PMMA powder. This shows as well that the addition of GMA terpolymer results in a binding between the PMMA particles and the polyolefinic base resin within the inventive masterbatch, preventing an extraction under high shear. In contrast thereto, in the comparative masterbatch MB, no such binding exists which results in the extraction of PMMA particles and thus a deterioration of the film properties as well as a disturbance of the packaging process because of the requirement for cleaning within shorter time periods.

The invention claimed is:

1. A monolayer film produced from a composition comprising a masterbatch composition consisting essentially of: a) a polyolefin polymer base resin, b) particles of cross-linked polymethyl-methacrylate (PMMA) having an average particle size of 1-20 μm which adhere to the surface of the polyolefin base resin film, and c) a terpolymer which promotes adhesion, selected from at least olefinic monomers, olefinic monomers containing an ester functionality and olefinic monomers containing an ether functionality, and mixtures thereof.

2. The monolayer film of claim 1, wherein the composition contains 1 to 20 weight % masterbatch composition.

3. The monolayer film of claim 1, wherein the composition contains 3 to 8 weight % masterbatch composition.

4. The monolayer film of claim 1, wherein the polyolefin polymer is selected from the group consisting of polyethylene, polypropylene and their copolymers and terpolymers.

5. The monolayer film of claim 1, wherein the polyolefin polymer is selected from a group consisting of a polyolefin chosen from LDPE, LLDPE, mLLDPE homopolymer, HDPE homopolymer, polypropylene homopolymer, a random ethylene propylene copolymer polypropylene, and a random terpolymer polypropylene of ethylene, propylene and butylene.

6. The monolayer film of claim 1, wherein the film is not, mono- or bi-axially oriented.

7. the monolayer film of claim 1, wherein the polyolefin base resin is a homopolymer, a copolymer or a terpolymer.

8. The monolayer film of claim 1, wherein the polyolefin base resin is obtained from ethylene and/or propylene monomers.

9. The monolayer film of claim 1, wherein the polyolefin base resin is selected from a group consisting of a polyolefin chosen from LDPE, LLDPE, mLLDPE, HDPE, polypropylene and mixtures thereof.

10. The monolayer film of claim 1, wherein the PMMA is contained in the composition in an amount of from 5 to 40 weight %.

11. The monolayer film of claim 1, wherein the PMMA is a round particle.

12. The monolayer film of claim 1, wherein the PMMA particles have an average particle size of 4-10 μm.

13. The monolayer film of claim 1, wherein the olefin in the terpolymer is ethylene.

14. The monolayer film of claim 1, wherein the olefinic ester in the terpolymer is an acrylic ester of the general formula

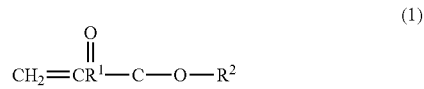

wherein $R^1$ may be H or $CH_3$ and $R^2$ may methyl, ethyl, n-butyl, i-butyl, t-butyl.

15. The monolayer film of claim 1, wherein the olefinic ether in the terpolymer is an unsaturated epoxide.

16. The monolayer film of claim 15, wherein the olefinie ether in the terpolymer optionally contain an additional ester functionality.

17. The monolayer film of claim 16, wherein the olefinic ether in the terpolymer having additional ester functionality is a glycidyl acrylate compound of the general formula

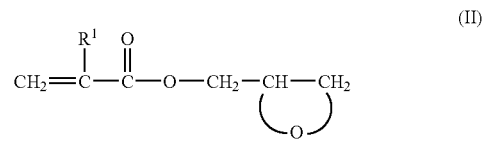

in which $R^1$ may be H or $CH_3$.

18. The monolayer film of claim 1, wherein the terpolymer is the terpolymer of ethylene, acrylic ester and glycidyl methacrylate and has the general formula

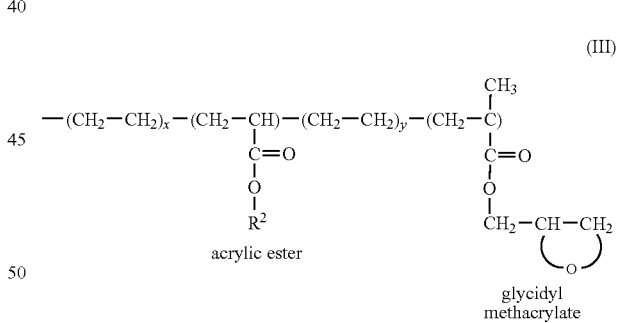

with $R^2$ being methyl, ethyl, n-butyl, i-butyl, t-butyl group, x, y being an integer selected from 1 to 100.

19. The monolayer film of claim 1, wherein the terpolymer is contained in the masterbatch composition in an amount of from 5 to 30 weight %.

20. The monolayer film of claim 1, wherein the terpolymer is contained in the masterbatch composition in an amount of from 8 to 12 weight %.

21. The monolayer film of claim 9, wherein the polyolefin base resin is selected from a group consisting of a random ethylene, propylene copolymer, a random polypropylene copolymer and mixtures thereof.

22. The monolayer film of claim 18, wherein the terpolymer is the terpolymer of ethylene, acrylic ester and glycidyl methacrylate and has the general formula

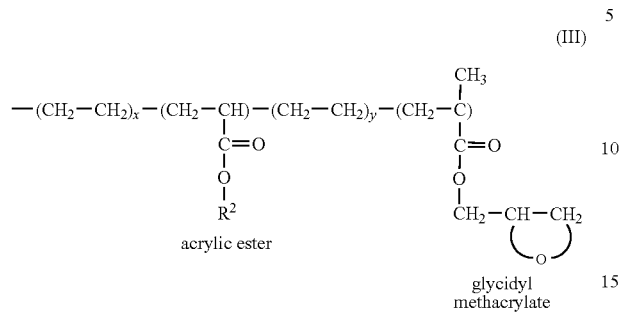
(III)

with $R^2$ being methyl, ethyl, n-butyl, i-butyl, t-butyl group, x, y being an integer selected from 10 to 30.

23. A packaging material comprising the monolayer film of claim 1.

24. A method for producing the monolayer film of claim 1, comprising:

diluting a masterbatch composition into a polyolefin base resin, wherein the masterbatch composition consisting essentially of the polyolefin base resin, polymethylmethacrylate (PMMA) pearls, and a terpolymer of an olefin, an olefinic ester, and an olefinic ether, wherein the PMMA particles have an average particle size of 1-20 µm, and wherein the polyolefin base resin is selected from a group consisting of a polyolefin chosen from LDPE, LLDPE, mLLDPE, HDPE, polypropylene, and mixtures thereof;

making a polyolefin film from the dilution comprising the masterbatch composition and polyolefin base resin.

25. The method of claim 24, further comprising the step of mono-axially or bi-axially orienting the layered polyolefin film.

* * * * *